United States Patent [19]

Johnson et al.

[11] Patent Number: 5,104,070

[45] Date of Patent: Apr. 14, 1992

[54] STRUCTURAL LATCH FOR VEHICLE COUPLING MECHANISMS

[75] Inventors: Caldwell C. Johnson, Dickinson; Maxime A. Faget, Dickinson, both of Tex.

[73] Assignee: Space Industries, Inc., Webster, Tex.

[21] Appl. No.: 360,242

[22] Filed: Jun. 1, 1989

[51] Int. Cl.⁵ ............................................ B64G 1/64
[52] U.S. Cl. .............................. 244/161; 292/251; 292/341.17; 292/DIG. 65
[58] Field of Search .............. 244/159, 161; 292/251, 292/92, 341.17, DIG. 65; 411/389, 178, 173, 177, 176; 403/21

[56] References Cited

U.S. PATENT DOCUMENTS

| | | | |
|---|---|---|---|
| 327,612 | 10/1885 | Stark | 411/178 |
| 2,737,222 | 3/1956 | Becker | |
| 2,746,782 | 5/1956 | Schamotta | 292/291 |
| 3,455,362 | 7/1969 | Mohrman | |
| 3,582,017 | 6/1971 | Zecca et al. | 244/161 |
| 3,820,741 | 6/1974 | Ratcliff | 244/161 |
| 4,373,309 | 2/1983 | Lutz | 411/389 |

FOREIGN PATENT DOCUMENTS

| | | | |
|---|---|---|---|
| 375132 | 7/1907 | France | |
| 21380 | 2/1895 | United Kingdom | 292/251 |
| 13107 | of 1915 | United Kingdom | |
| 103860 | of 1917 | United Kingdom | |

*Primary Examiner*—Galen Barefoot
*Attorney, Agent, or Firm*—Venable, Baetjer and Howard

[57] ABSTRACT

A structural latch is provided for mechanically joining vehicle coupling mechanisms such as spacecraft coupling and berthing mechanisms. The structural latch is manually operable to join the coupling mechanisms. Each structural latch is configured to be readily removable from the joined coupling mechanisms in the event the latch becomes inoperable so as to effect coupling mechanism separation.

15 Claims, 7 Drawing Sheets

STRUCTURAL LATCH FOR VEHICLE COUPLING MECHANISMS

BACKGROUND OF THE INVENTION

The present invention relates generally to structural latches for coupling apparatus for vehicles such as spacecraft, and is particularly concerned with a structural latch that is operable from the pressurizable side of the coupling apparatus and which is removable from the apparatus in the event the latch becomes inoperable or otherwise requires replacement. The invention relates further to the subject matter disclosed in our previously-filed Disclosure Document No. 185,822 entitled "Structural Latches For Spacecraft Docking/Berthing Mechanisms", which was filed in the United States Patent and Trademark Office on February 5, 1988.

Coupling apparatus offer a practical means for the mechanical joining, such as by berthing or docking, of spacecraft for the logistical support and transfer of crew members, for the mutual support of two or more spacecraft by a sharing of their individual facilities and capabilities, and for enabling the on-orbit assembly of spacecraft. Other on-orbit operations that require spacecraft to be docked include the structural expansion of spacecraft, the addition or exchange of modules containing expendable supplies and equipment needed for spaceborne experiments and manufacturing processes, and the on-orbit repair and maintenance of spacecraft. Many of these operations are best implemented by crew members moving between the spacecraft in what is known as a "shirt-sleeve" environment, that is, in a pressurized, earth-like environment. The use of a properly designed coupling apparatus allows unrestricted passage of the crew between spacecraft without the need for cumbersome pressure suits.

In the art relating to vehicle coupling apparatus, a distinction exists between the terms "docking" and "berthing", although both terms describe the coupling of two or more spacecraft while on-orbit. The terms may be considered to characterize a difference in the manner in which the coupling is effected. To achieve a complete and successful coupling, the interfacing surfaces of the respective coupling apparatus must be fully coupled, or superimposed, by a force applied to the spacecraft. In berthing, the force is applied by a positioning system such as a manipulator arm carried by a neighboring spacecraft or one of the spacecraft to be joined. In docking, the force arises from the momentum imparted to the spacecraft to be coupled by propulsion means such as thrusters on one or both of the spacecraft. For the purposes of the following description, usage of the term "coupling" is meant to include both "docking" and "berthing" as well, unless the context clearly indicates otherwise.

Various types of apparatus have been proposed for accomplishing a temporary or permanent mechanical coupling between two or more spacecraft. A docking apparatus according to the prior art typically consists of a pair of complementary docking mechanisms, the first docking mechanism being attached to a port or opening of a first spacecraft and the second, complementary docking mechanism being attached to a similar port or opening of the second spacecraft. Each docking mechanism typically includes a flange which may be affixed to the port or opening of the spacecraft and is designed to encircle the aperture of the port. The flange is generally annular and is attached to the periphery of the port so as to provide for the unobstructed passage of crew members through the port aperture.

The docking mechanisms of the prior art first make contact with one another at their respective outer mating, or interface, surfaces during the course of a docking maneuver. Alignment guides at the periphery of each of the interface surfaces interdigitate with corresponding alignment guides carried by the complementary docking mechanism to correct slight rotational (clocking) misalignments of the mechanisms. Once the docking mechanisms are superposed over one another, they are mechanically joined by the operation of a plurality of complementary, hook-like structural latches. When the latches are fully engaged, the two spacecraft are locked together and provide a passage extending between the coupled spacecraft. Disengagement of the structural latches permits for uncoupling of the docking mechanisms and separation of the spacecraft from one another.

The hook-like structural latches of the prior art docking mechanisms extend from apertures spaced at even intervals around the circumference of the interface surface of each docking mechanism. The apertures of the respective docking mechanisms are alignable to permit interlocking of complementary hook-like latch elements. A plurality of motor-driven cams within one or both of the docking mechanisms are selectively actuable to extend and retract the hook-like devices to their respective apertures to permit coupling and disengagement of the respective docking mechanisms.

Structural latches have been operated on docking apparatus used in spaceflight during the Apollo program of the National Aeronautics and Space Administration (NASA) and on spacecraft developed and orbited by the Union of Soviet Socialist Republics (USSR). Such experience in the use of structural latches according to the prior art has shown them to be deficient in several aspects. As the structural latches are cam-driven, the components of the latch must be manufactured to precise tolerances and be adjusted periodically to ensure a proper engagement and retraction action between the respective docking mechanisms. A system of such complexity is therefore costly, mechanically complex, excessively heavy, and bulky. It is difficult to achieve consistent and reliable actuation of all of the latches because of the multiplicity of moving parts and because the parts are driven by one or more motors or other power devices. The motor drive requires close operator supervision and a complex control system for monitoring and preventing equipment malfunction, such as a jammed latch. In some instances, a malfunction can cause the motor drive to stall, which in turn can cease actuation of all other latches in the system, or in severe cases can damage or disable the motor drive and the jammed latch. In the event that one or more latches malfunction or fail to disengage when so commanded while on-orbit, an extensive effort is required to manually disengage them. Should latch disengagement from the interior of the spacecraft prove to be unsuccessful, an extra-vehicular activity may be necessary in order to effect the extrication and replacement of the failed latch.

Further NASA missions which require the use of a coupling apparatus are currently in the planning stage. In the near future, it is envisioned that the Space Transportation System (also referred to as the Space Shuttle Orbiter) developed in the United States by NASA will be used to service large, free-flying spacecraft, such as the proposed NASA Space Station and the Industrial Space Facility (ISF) developed by Space Industries Incorporated. Such spacecraft will be assembled and resupplied on orbit and will require vehicle coupling operations to be carried out on a frequent basis by the Space Transportation System. Therefore, relatively reliable structural latches will be required for use in coupling mechanisms carried by both the free-flying spacecraft and by the payload-carrying space vehicle in order to effect spacecraft coupling.

With respect to the Space Shuttle Orbiter, it is envisioned that this spacecraft will carry in its payload bay a coupling mechanism for engaging a similar coupling mechanism carried by another spacecraft. Because the payload bay of this spacecraft is positioned under a pair of selectively operable doors, the doors will have to be opened in order to provide the approaching spacecraft access to the coupling mechanism carried within the payload bay. Following disengagement and release of the spacecraft, the payload bay doors must be closed to permit the Space Shuttle Orbiter to re-enter the earth's atmosphere in a controlled manner. Therefore, a failure of the structural latches of the respective coupling mechanisms to disengage will prevent the release of the coupled spacecraft, thereby precluding closing of the payload bay doors. The inability to close the payload bay doors will severely jeopardize the mission and will preclude the return of the Space Shuttle Orbiter to earth.

Accordingly, an object of the present invention is to provide a structural latch which permits safe and reliable coupling operations to be conducted between two spacecraft.

Another object of the present invention is to provide a structural latch which is relatively simple in design, compact in size, lighter in weight, and less expensive to manufacture than known structural latch apparatus.

A further object of the present invention is to provide a structural latch that is manually operable, and which can be used to selectively couple and uncouple corresponding coupling mechanisms.

A further object of the present invention is to provide a structural latch which is readily removable and replaceable while spacecraft coupled thereby are on-orbit, the latch being removable without the necessity of time-consuming, extensive, or perilous procedures such as extra-vehicular excursions.

SUMMARY OF THE INVENTION

The present invention provides a structural latch for joining vehicle coupling apparatus that overcomes the inherent limitations of previously proposed structures, particularly latches which consist of a plurality of motorized, cam-operated hook-like devices that extend from the interface surface of one coupling mechanism so as to engage similar hook-like devices in the interface surface of a corresponding coupling mechanism.

In accordance with the invention, the structural latch joins vehicle coupling apparatus such as first and second docking or berthing mechanisms, wherein the first and second coupling mechanisms each comprise a first, pressurizable side, a peripheral interface surface formed along a second side, and a flange extending between the pressurizable side and the interface surface so as to define a peripheral boundary of an interior cavity. A channel passageway extends between the interface surface and the pressurizable side of each coupling mechanism. The channel passageways are coaxially alignable upon superposition of the coupling mechanisms. Preferably, the channel passageways of the first and the second coupling mechanisms are arranged in parallel pairs to facilitate installation of a new structural latch adjacent a pre-existing latch in the event of latch failure.

The structural latch comprises a bolt extensible from the channel passageway of the first coupling mechanism to the channel passageway of the second coupling mechanism, means for establishing a pressure-tight seal between the pressurizable side of the first coupling mechanism and the bolt, a bolt receptacle mountable adjacent the channel passageway of the second coupling mechanism, and means detachably coupled to the bolt receptacle adjacent the channel passageway of the second coupling mechanism for retaining the bolt receptacle adjacent the channel passageway. The bolt receptacle is reciprocably extensible through the coaxially-aligned channels of the first and second coupling mechanisms. The bolt receptacle retaining means is selectively removable from the bolt receptacle to permit selective retrieval of the bolt and engaged bolt receptacle through the coaxially-aligned channel passageways of the coupling mechanisms. The bolt can be rotatably advanced manually or through the use of appropriate powered equipment to engage and attract the bolt receptacle in order to draw together the first and second coupling mechanisms.

The disclosed invention also provides a method for replacing a first bolt and engaged first bolt receptacle of a structural latch positioned in first and second joined coupling mechanisms, in which the coupling mechanisms each comprise a first, pressurizable side, a peripheral interface surface formed along a second side, and a flange extending between the pressurizable side and the interface surface so as to define a peripheral boundary of an interior cavity. First and second generally parallel channel passageways extend between the peripheral interface surface and the pressurizable side of each coupling mechanism and are arranged such that corresponding first and second channel passageways are coaxially alignable upon superposition of the respective coupling mechanisms. The first bolt receptacle is retained in position adjacent the first channel passageway of the second coupling mechanism by a removable receptacle retainer member and receives the first bolt as it extends through the coaxially-aligned first channel passageways of the superposed coupling mechanisms. The method comprises the steps of mounting a second bolt receptacle adjacent the second channel passageway of the second coupling mechanism, inserting a second bolt through the second channel passageway of the first coupling mechanism, advancing the second bolt to engage the second bolt receptacle, securing together the second bolt and second bolt receptacle, removing the receptacle retaining means from the first receptacle, and retrieving the first bolt and engaged bolt receptacle from the coaxially-aligned first channel passageways of the joined coupling mechanisms.

BRIEF DESCRIPTION OF THE DRAWINGS

The various objects, advantages, and novel features of the present invention will be more clearly understood from the following detailed description when read in conjunction with the appended drawings, in which.

DETAILED DESCRIPTION OF THE PREFERRED EMBODIMENTS

Figure 1:
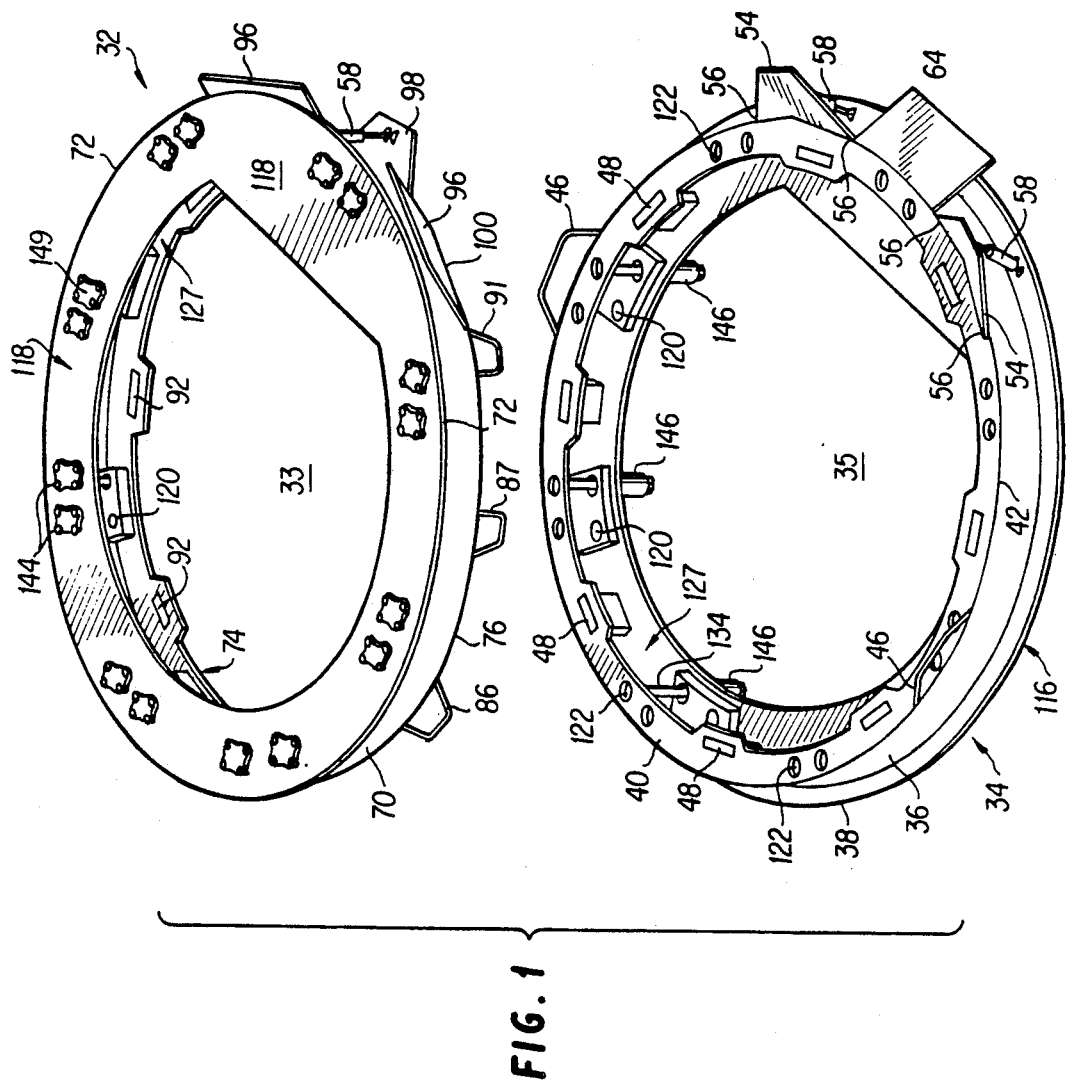
FIG. 1 is a perspective view of a pair of upper and lower coupling mechanisms constructed in accordance with the present invention, shown at the onset of coupling.
Figure 2:
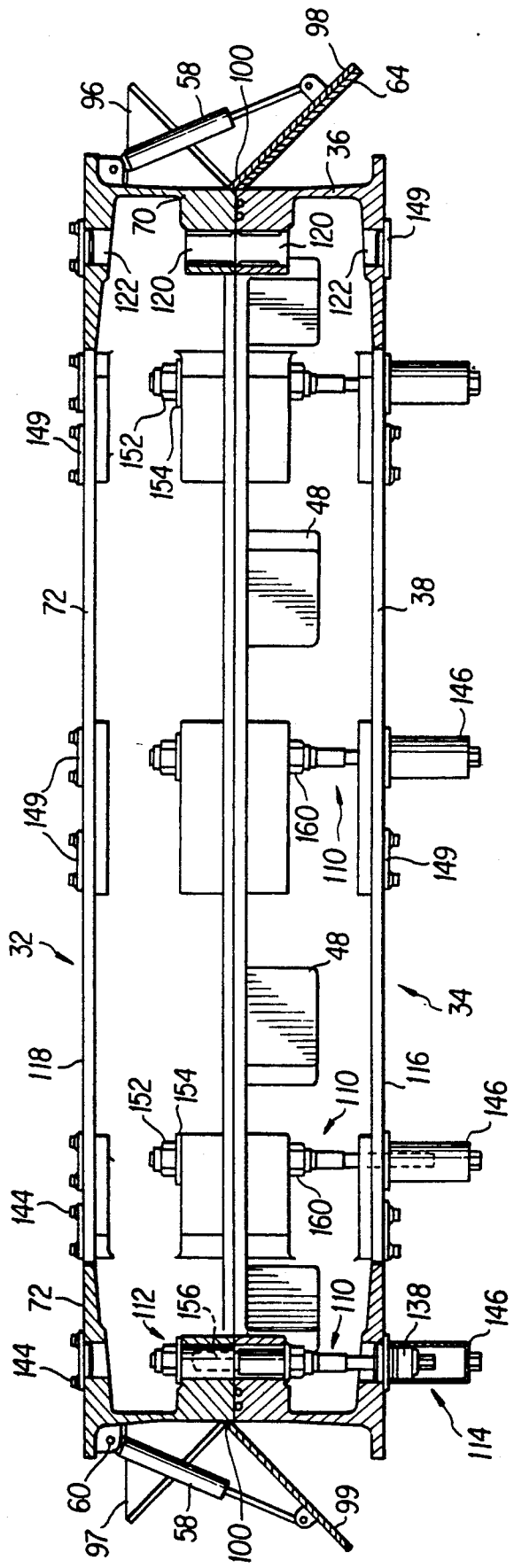
FIG. 2 is a cross-sectional view of the coupling mechanisms of FIG. 1 following superposition of their respective coupling interfaces.

With reference to the drawings, wherein like reference numerals are used to refer to like parts throughout the various views, and with particular reference to FIGS. 1 and 2, there is illustrated a vehicle coupling apparatus which includes a structural latch constructed in accordance with the present invention. As used throughout this detailed description, the term "coupling" includes structural joining as a result of both docking and berthing maneuvers, unless the context of the disclosure clearly indicates otherwise. In the illustrated embodiment, an upper coupling mechanism 32 is shown in spaced relation with a complementary lower coupling mechanism 34. Preferably, the coupling mechanism is in the form of the berthing mechanism described in the co-pending patent application of Caldwell C. Johnson, Ser. No. 313,497 filed on Feb. 22, 1989 and entitled "Spacecraft Berthing Mechanism With Discrete Impact Attenuation Means", the disclosure of which is hereby expressly incorporated by reference. The upper and lower coupling mechanisms 32 and 34 are each preferably provided with a generally annular configuration and are mountable on separate spacecraft (not shown) to facilitate the mechanical linking of the spacecraft. Each coupling mechanism 32 and 34 is attachable to the exterior surface of a corresponding one of the spacecraft, preferably adjacent the periphery of a port or other opening on the spacecraft in surrounding relationship thereto. However, the coupling mechanisms 32 and 34 can be mounted to their respective spacecraft at any position thereon which provides for an advantageous coupling configuration and which permits the necessary access to the coupling components of the coupling mechanisms for effecting spacecraft coupling in the manner described in detail below. Apertures or portals 33 and 35 can be provided in the coupling mechanisms 32 and 34, respectively, that are dimensioned so as to permit for the unimpeded passage of crew members and materials through the respective ports of the spacecraft. The upper and lower coupling mechanisms 32 and 34 are depicted in FIG. 1 in positions and alignment corresponding to the onset of coupling.

The lower coupling mechanism 34 includes a peripheral flange 36 having a rim 38 at its back end and an interface surface 40 at its front end. Inset into the interface surface 40 are a plurality of o-ring seals 41 which facilitate establishment of an air-tight seal between the upper and lower mechanisms 32 and 34 when the mechanisms are coupled to one another. The rim 38 is attachable to the periphery of a spacecraft port by any of a variety of fastening means known in the art. The rim 38 extends inwardly along the underside of the lower coupling mechanism 34 toward the peripheral flange 36, which circumscribes the portal 35. The peripheral flange 36 meets the interface surface 40 at an edge 42. A pair of opposed alignment rails 46 is fixed to the edge 42 for facilitating alignment with the upper coupling mechanism 32.

Inset into the interface surface 40 are eight evenly spaced electromagnetic tractor magnets 48, each of which has an exposed face which is generally flush with the interface surface 40. Attached to the edge 42 of a minor portion of the circumference of the flange 36 is a pair of spaced alignment guides 54. Each alignment guide 54 is shaped as a generally trapezoidal planar member and includes two hinged joints 56 which connect the alignment guide 54 to the peripheral flange 36. The hinged joints 56 permit alignment guides 54 to swing in a limited arc about the edge 42. Each alignment guide 54 is supported along a lower face thereof by a strut 58 which extends from a pivot 60 on the rim 38. Positioned between the alignment guides 54 and affixed to the peripheral edge 42 is a rigid planar ramp 64. Whereas the alignment guides 54 extend from the edge 42 in an upward direction away from the rim 38, the ramp 64 conversely extends in a downward direction toward the rim 38.

The upper coupling mechanism 32 is designed to mate with the lower coupling mechanism 34, and therefore includes elements complementary to those described hereinabove. The upper coupling mechanism 32 includes a peripheral flange 70 having a rim 72 and an interface surface 74 joined to the flange 70 along a flange edge 76. The rim 72 is attachable to the exterior of a spacecraft, preferably at the periphery of a spacecraft port, by any of a variety of fastening means known in the art. The rim 72 extends inwardly along a back end of the upper coupling mechanism 32 to circumscribe the portal 33 formed in the flange 70. Affixed to the flange edge 76 is a plurality of radially-extending alignment rails 86, 87, and 91. Inset into the interface surface 74 are eight tractor plates 92, each of which has an exposed face that protrudes slightly from the interface surface 74. The tractor plates 92 correspond in position to the tractor magnets 48 of the lower coupling mechanism 34 when the coupling mechanisms 32 and 34 are properly aligned for coupling with one another.

Pairs of spaced ramps 96, 97 separated by pivotable alignment guides 98, 99 are attached to the edge 76 of a minor portion of the circumference of the peripheral flange 70 of the upper coupling mechanism 32 in a complementary manner to the pair of alignment guides 54 and the ramp 64 carried by the lower coupling mechanism 34. Each alignment guide 98, 99 is shaped as a generally trapezoidal planar member and includes two hinged joints 100 for connecting the alignment guide 98, 99 to the peripheral flange 70. Each alignment guide 98, 99 is further supported by a strut 58 extending from a pivot 60 on the rim 72 to the upper face of the alignment guide 98. The struts 58 of the upper and lower coupling mechanisms 32, 34 are preferably non-rebounding impact attenuators which absorb without rebound the force of the initial impact incident to joining of the coupling mechanisms. Alignment guides 54, 98, and 99 are pivotable in a limited, preferably unidirectional arc about their respective edges 42 and 76, whereas the ramps 64, 96, and 97 are fixedly mounted thereto.

Further details concerning the preferred embodiment of the coupling mechanisms 32 and 34 can be found in the commonly assigned U.S. Pat. No. 4,728,061, issued to Caldwell C. Johnson et al. on Mar. 1, 1988 entitled "Spacecraft Operable In Two Alternative Flight Modes"; in the commonly assigned copending U.S. patent application of Maxime A. Faget et al., filed on March 20, 1985 under Ser. No. 713,817 and entitled "Modular Spacecraft System"; in the commonly assigned copending U.S. patent application of Caldwell C. Johnson et al., filed on March 20, 1985 under Ser. No. 713,882 and entitled "Spacecraft With Articulated Solar Array and Method for Array Deployment"; in the commonly assigned copending U.S. patent application of Caldwell C. Johnson et al., filed on Nov. 27, 1987 under Ser. No. 125,993 and entitled "Apparatus and Method For Docking Spacecraft"; and in the commonly assigned copending U.S. patent application of Caldwell C. Johnson filed on Feb. 22, 1989 under Ser. No. 313,497 and entitled "Spacecraft Berthing Mechanism With Discrete Impact Attenuation Means"; all of which are expressly incorporated by reference herein.

Figure 3:
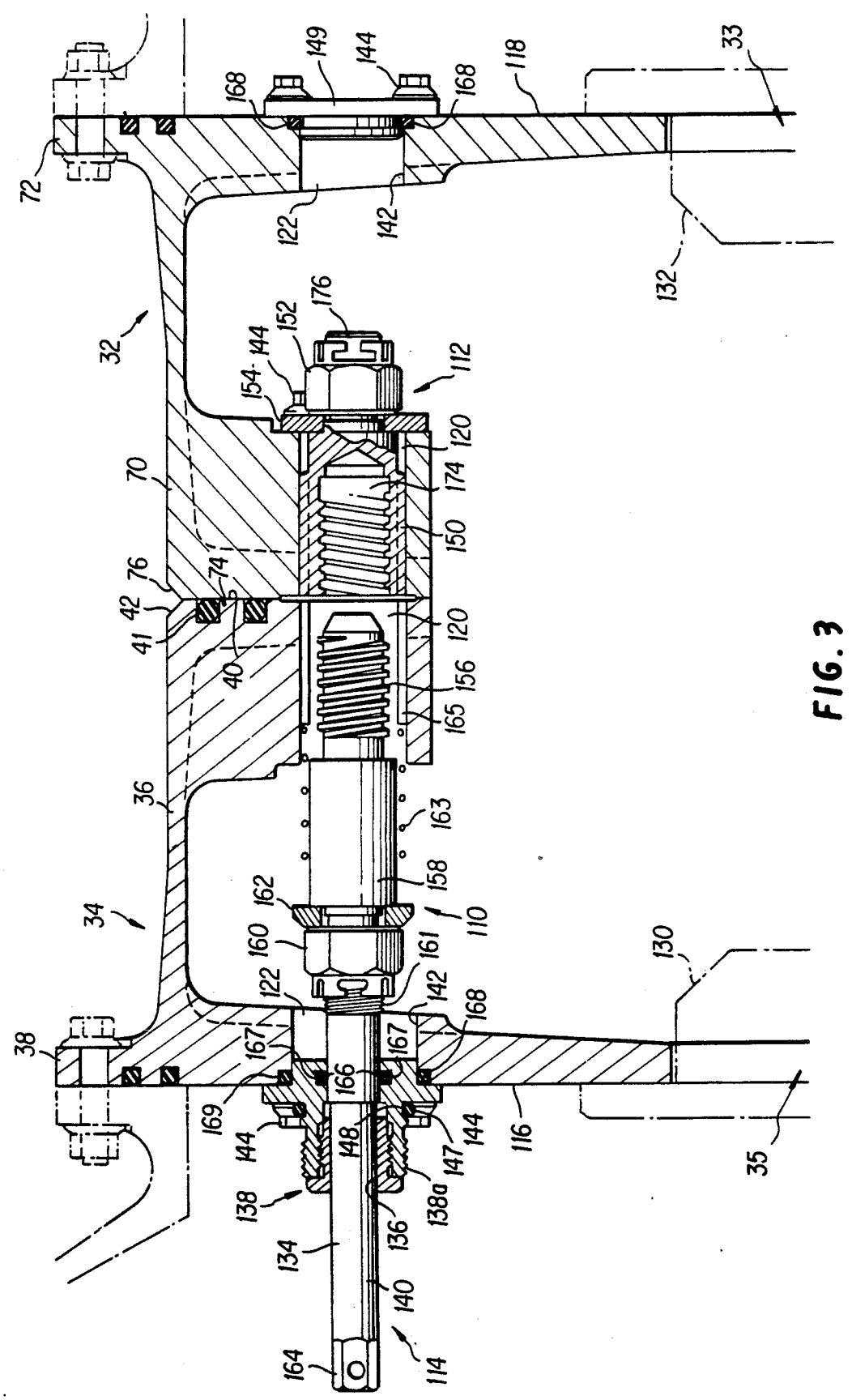
FIG. 3 is a sectional view of a portion of the superposed coupling mechanisms depicted in FIG. 2, illustrating details of a structural latch constructed in accordance with the present invention, prior to the onset of latch engagement.
Figure 4:
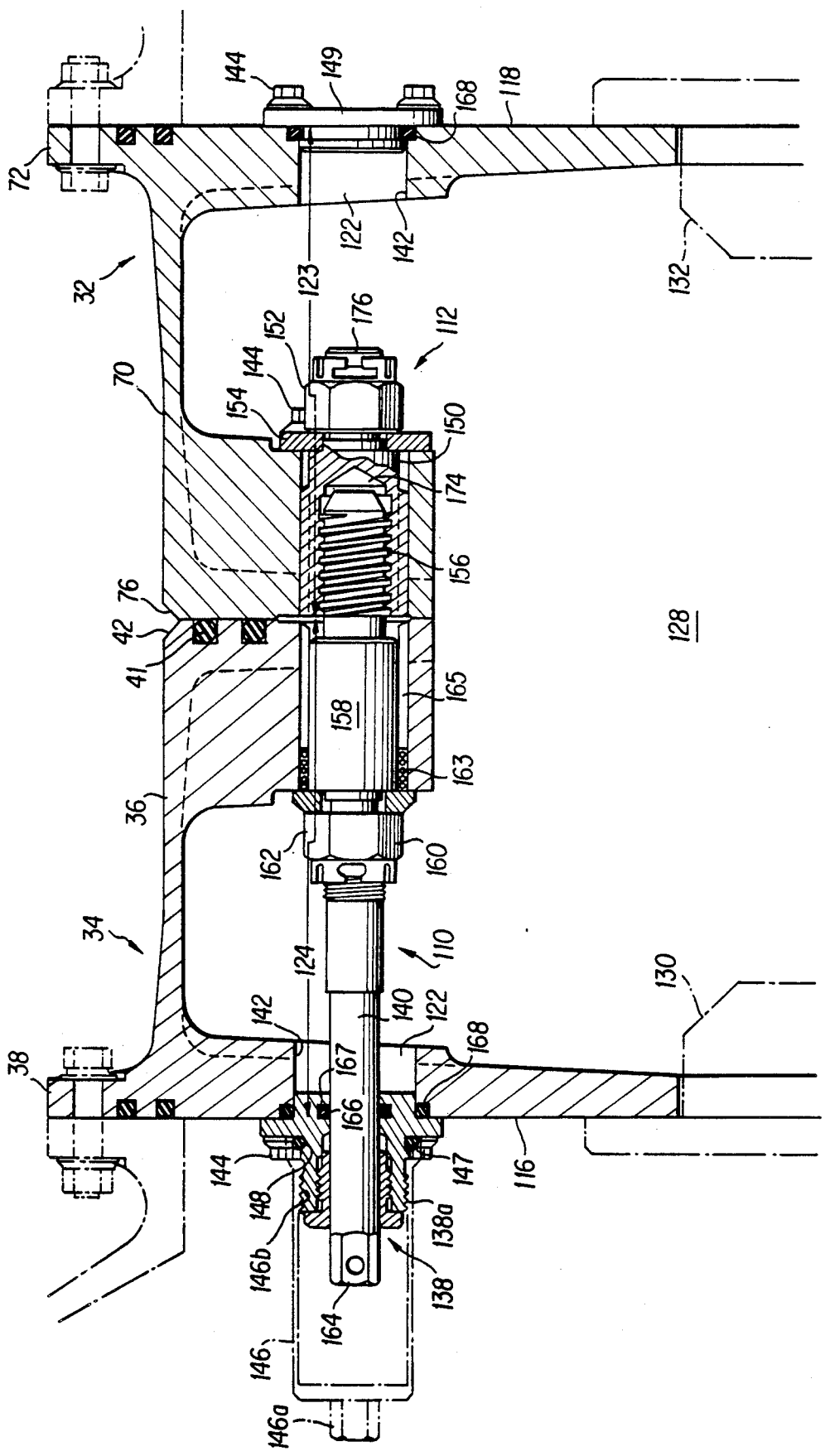
FIG. 4 is a sectional view of the structural latch depicted in FIG. 3, illustrating structural latch engagement.

As is more clearly depicted in FIGS. 2 through 4, an improved structural latch constructed in accordance with the present invention comprises an active component 110 and passive component 112 which together constitute a structural latch assembly 114. The active and passive latch components 110, 112 are selectively and mutually engageable to effect "hard" (semi-permanent) docking of the upper and lower docking mechanisms. Corresponding active and passive components 110, 112 are axially alignable to provide for mechanical coupling of the coupling mechanisms 32 and 34. Generally, either one of the two coupling mechanisms 32 and 34 is equipped with a plurality of the active component 110 of the structural latch assembly, whereas the other coupling mechanism is equipped at corresponding locations with a plurality of the passive component 112 of the structural latch assembly 114. In the preferred embodiment, each active component 110 is positioned at the interface surface 40 of the lower coupling mechanism 34 at a point midway between each pair of tractor magnets 48 and extends from the interface surface 40 through the flange 36 to the back, pressurizable side 116 of the flange 36. Each corresponding passive component 112 is positioned at the interface surface 74 of the upper coupling mechanism at a point midway between each pair of adjacent tractor plates 92 and extends from the interface surface 74 through the flange 70 to the back, pressurizable side 118 of the flange 70. The back, pressurizable sides 116, 118 of the lower and upper coupling mechanisms 34 and 32, respectively, are preferably mounted adjacent the port or similar opening of the spacecraft so as to become pressurizable to permit "shirt-sleeve" operation of the structural latch assemblies 114 in the manner described below.

Because the lower coupling mechanism 34 is equipped with a plurality of active components 110, the lower coupling mechanism 34 can be characterized with respect to the upper coupling mechanism 32 as an "active" mechanism, whereas the upper mechanism 32 (being equipped with a plurality of the passive components 112) can be considered a "passive" mechanism. However, it will be appreciated that the characterization of each of the respective coupling mechanisms 32, 34 as either "active" or "passive" is related to which of the latch components 110, 112 is mounted thereon, and is subject to change as a result of removal and replacement with the other of the two types of latch components 110, 112. Therefore, the interchangeability of the arrangement of latch components on the coupling mechanisms is to be understood to apply to the following description except when the context clearly indicates otherwise. When the distinction is useful in the following description, the upper coupling mechanism 32 will be termed the "passive" coupling mechanism 32, and the lower docking mechanism 34 will be termed the "active" coupling mechanism 34.

The lower coupling mechanism 34 includes a plurality of corresponding coaxial pairs of inner and outer channels 120 and 122, each of which pairs forms a passageway 124 which extends from the pressurizable side 116 of the lower coupling mechanism 34 to the interface surface 40. Similarly, the upper coupling mechanism 32 includes a plurality of corresponding coaxial pairs of inner and outer channels 120 and 122, each of which pairs forms a channel passageway 123 from the pressurizable side 118 of the coupling mechanism 32 to the interface surface 74. When the coupling mechanisms 32 and 34 are properly aligned and joined at their respective interface surfaces 74 and 40, each coaxial pair of inner and outer channels 120, 122 of the upper mechanism 32 becomes coaxially aligned with the corresponding coaxial pair of inner and outer channels 120, 122 of the lower coupling mechanism 34. The respective inner and outer channels 120 and 122 are appropriately dimensioned to facilitate insertion and removal therefrom of the active and passive components 110, 112 of the latch assembly 114 in the manner set forth below.

The joining of the lower and upper coupling mechanisms 34 and 32 establishes an enclosed volume or vestibule 128 defined by the peripheral flange 36, 70 of the respective coupling mechanisms. The vestibule 128 is accessible from either of the pressurizable sides 116, 118 of the coupling mechanisms by removing a hatch cover 130, 132 from the respective portal 35, 33.

Each structural latch assembly 114 extends from an outer channel 122 of one of the coupling mechanisms, such as the lower mechanism 34, and into the coaxially-aligned inner channels 120 of both the lower and upper coupling mechanisms 34 and 32. The active component of the latch assembly 114 includes a bolt 134 which is supported in a central aperture 136 of a compression seal or gland 138 positioned in the outer channel 122. The compression seal 138 provides a pressure-tight seal between the bolt shank 140 and the interior bore 142 of the outer channel 122, and hence between the pressurizable sides 116, 118 of the respective coupling mechanisms 34, 32 and the vestibule 128. Fasteners 144 secure the compression seal 138 to the respective coupling mechanism. A compression seal cap 146 (FIG. 4) insertable over an exterior surface 138a of the compression seal 138 can optionally be provided to protect the enclosed portion of the compression seal 138 and the respective structural latch assembly, and to provide a second pressure-tight seal around the latch assembly 114. The cap 146 can be provided with a coupling member 146a such as a hexagonal head for coupling with a corresponding motorized or manually operable tool. The exterior surface 138a of the compression seal 138 can be threaded as shown to receive and retain a correspondingly-threaded interior surface 146b of the cap 146. The cap 146 can therefore be rotatably secured to the compression seal 138 upon mutual engagement of their respective, correspondingly-threaded surfaces. An o-ring seal 147 mounted within a recess 148 formed in the exterior surface 138a of the compression seal provides for the establishment of a pressure-tight seal between the cap 146 and the compression seal 138 upon cap installation and insertion over the seal 147, as illustrated in FIG. 4. Outer channels 122 that are not occupied with a compression seal 138 are sealed with a channel cover 149 which is secured to the respective coupling mechanism by fasteners 144.

The passive component 112 includes a receptacle 150 and retainer means such as a retainer nut 152, shoulder washer 154, and fasteners 144 for securing the shoulder washer 154 to the passive coupling mechanism 32. A structural latch assembly 114 is formed from the insertion of a bolt 134 into the outer and inner channels 122 and 120, respectively, of the active coupling mechanism 34, and the mounting of a receptacle 150 adjacent the inner channel 120 of the passive coupling mechanism 32.

Each bolt 134 includes a threaded tip 156, a barrel 158, stop means such as a stop nut 160 adjustably retained along threads 161 formed along the exterior surface of the bolt, a coordinate stop washer 162 and spring 163 positioned along the bolt barrel, and a hexagonal head 164 adapted for use with a correspondingly-shaped motorized or manually-operable hand tool for rotatably advancing or withdrawing the bolt with respect to the bolt receptacle 150. When the active component 110 is disengaged from its corresponding passive component, as shown in FIG. 3, the threaded bolt tip 156 is received within the inner channel 120 of the coupling mechanism in which its corresponding compression seal is mounted, and spring 163 urges the stop washer 162 and stop nut 160 away from the transverse edges of a plurality of spline grooves 165 formed within the inner channel 120. Each of the inner channels of coupling mechanisms 32 and 34 is preferably provided with a plurality of spline grooves 165 to permit interchangeability of active and passive components 110, 112 within the coupling mechanisms. As a consequence of this latch mounting arrangement, the bolt 134 is spring-biased toward a retracted, disengaged position by the expansion force exerted by the spring 163 in order to protect the bolt tip 156 from unintended contact with the upper coupling mechanism.

The compression seal 138 maintains a pressure-tight seal about the bolt shank 140 while still allowing the bolt 134 to move longitudinally therein through the seal aperture 136. The compression seal also maintains a pressure-tight seal at the lateral edges of the outer channel 122. The seal between the compression seal 138 and the bolt shank 140 arises from the cooperation between an o-ring seal 166 positioned within a recess 167 formed in the central aperture 136 of the compression seal 138 and the bolt shank. The pressure-tight seal at the lateral edges of the outer channel 122 arises from the cooperation between an o-ring 168 positioned within a recess 169 formed in the outer channel 122 and the edges 138b of the compression seal as the compression seal is directed against the o-ring 168 and secured to the coupling mechanism by fasteners 144.

Each bolt receptacle 150 includes an internally threaded bore 174 for receiving the threaded tip 156 of the bolt, and a threaded receptacle end 176 for receiving the shoulder washer 154 and retainer nut 152 of the receptacle retaining means. The bolt receptacle 150 extends into the inner channel 120 of the upper coupling mechanism 32 and is splined along its exterior surface so as to cooperate with the spline grooves 165 to render the receptacle 150 non-rotatable when inserted into the correspondingly-grooved inner channel 120. However, other conventional means for rendering the receptacle 150 non-rotatable within the inner channel 120 can be employed. The shoulder washer 154 is positioned over the threaded end 176 of the bolt receptacle 150 and secured to the passive coupling mechanism 32 by fasteners 144. Therefore, threading of the retainer nut 152 onto the threaded end 176 of the bolt both longitudinally and rotatably fixes the position of the receptacle 150 in the inner channel. Means such as a frangible retainer nut and surrounding containment shroud (not shown) can optionally be provided to permit for rapid separation of the bolt 134 from the receptacle 150, and therefore the two spacecraft joined thereby, as may be desired in certain emergency situations.

The bolt 134, stop nut 160, stop washer 162, and spring 164 are dimensioned so as to be insertable as a preassembled unit (with the threaded bolt tip 156 leading) from the pressurizable side of one of the coupling mechanisms, such as active coupling mechanism 34, through an unoccupied outer channel 122 toward a corresponding unoccupied inner channel 120. This construction is particularly beneficial in the event of failure of one or more neighboring latch assemblies 114. Prior to insertion of the bolt assembly, a bolt receptacle 150 is mounted in a corresponding, axially-aligned inner channel 120 of the coupling mechanism 32. The bolt receptacle 150 can be mounted to the inner channel 120 from a position within the vestibule 128 and is secured to the inner channel by fasteners 144, shoulder washer 154, and retainer nut 152. The compression seal 138 and its associated o-rings 147 and 166 can then be mounted over the hexagonal head 165 of the bolt 134, and the compression seal fastened by fasteners 144 to the flange 36 to seal the outer channel 122 of the active coupling mechanism 34. Cap 146 can optionally be provided to further seal the latch assembly 114 following coupling of the respective active and passive components 110, 112.

A method of coupling the active and passive coupling mechanisms 34 and 32 will now be described. For the purposes of this description, the passive coupling mechanism 32 will be assumed to be in motion and the active coupling mechanism 34 will be considered to be stationary. However, the following discussion will be equally applicable to situations in which the passive coupling mechanism 32 is stationary and the active coupling mechanism 34 is in motion, or in which both active and passive coupling mechanisms 34 and 32 are in motion. Furthermore, for the purpose of consistency with the terminology generally used in the art, the mutual approach of the two coupling mechanisms will be referred to as "closing"; the rotation of one coupling mechanism about its longitudinal axis, when that axis intersects or is coincident with the corresponding axis of another coupling mechanism, as "clocking"; the stages of initial contact and complete contact of the respective interface surfaces, as "partial" and "full" closure, respectively; the temporary connection of one coupling mechanism to the other after full closure of the interface surfaces, as a "soft dock"; and the mechanical locking together of the interface surfaces following a soft dock, as a "hard dock". It is to be understood that usage of the term "docking" as used throughout the description of spacecraft coupling is meant to include spacecraft coupling by berthing as well, unless the context of the description clearly indicates to the contrary.

Prior to docking, the active and passive coupling mechanisms 34 and 32 are fitted with a plurality of structural latch assemblies 114 as described hereinabove. As illustrated in FIGS. 3 and 4, selected ones of the coaxial pairs of inner and outer channels 120 and 122 of the active coupling mechanism 34 have been fitted with an active component 110, such as a retracted bolt 134 and compression seal 138. Each of the inner channels 120 of the passive coupling mechanism 32 has been fitted with a passive component 112, such as a receptacle 150, shoulder washer 154, and capture nut 152. The active and passive coupling mechanisms 34 and 32 are properly clocked prior to soft docking in a manner such that each of the retracted bolts 134 is aligned with a corresponding receptacle 150. In the currently-preferred embodiment of the invention, coupling mechanisms 32 and 34 are configured as mutually engageable berthing mechanisms, as set forth in the previously-identified co-pending patent application of Caldwell C. Johnson, Ser. No. 313,497, entitled "Spacecraft Berthing Mechanism with Discrete Impact Attenuation Means". This orientation of complementary parts can be maintained in the preferred embodiment if the passive coupling mechanism 32 is clocked in one of two positions that differ by 180 degrees of rotation. The first, and preferred, orientation places the alignment guide 98 (FIG. 1) in interfacing relationship with ramp 64, and ramps 96 opposite the locations of alignment guides 54. The second orientation places the remaining alignment guide 99 (FIG. 2) in interfacing relationship with the ramp 64, and ramps 97 opposite the position of corresponding alignment guides 54. The preferred orientation, as shown in FIG. 1, superposes the coupling mechanisms such that the dimensions of the aperture defined by portals 33 and 35 in flanges 70 and 36, when respectively superimposed, are maximized.

The stage of partial closure of the passive coupling mechanism 32 and the active coupling mechanism 34 is initiated by contact between the leading edge of alignment guide 98 and the upper surface of ramp 64, and between the leading edges of alignment guides 54 and the active surfaces of ramps 96. Struts 58 absorb the impact of the closing motion and decelerate the passive coupling mechanism 32, preferably without rebound effects. Progressively greater coordination between the alignment guides 54 and 98 and the corresponding ramps 64 and 96, respectively, aligns the interface surfaces 40 and 74 while the interface surfaces are brought into face-to-face contact, or full closure. Optimal superposition of the interface surfaces 40 and 74 is facilitated by the interdigitation of the alignment rails 46, 86, 87 and 91. Alignment guide 99 and ramps 97 are operable in the same fashion as described above when the orientation of the passive coupling mechanism 32 is clocked 180 degrees so as to position them complementary to alignment guides 54 and ramp 64.

A temporary and semi-permanent coupling, or soft dock, of the active and passive coupling mechanisms 34 and 32 upon a full closure of the interface surfaces 40 and 74 is established by energizing the tractor magnets 48 to attract and retain the corresponding tractor plates 92 of the passive coupling mechanism 32. While the active and passive coupling mechanisms 34 and 32 are magnetically coupled, a hard dock can be established by coupling together the active and passive components 110, 112 of the structural latch assemblies.

A hard dock is established by removing the cap 146 (if present) and rotatably advancing the hexagonal bolt head 165 so that the threaded bolt tip 156 is inserted into the receptacle bore 174. As the bolt tip 156 is advanced into the receptacle bore 174, the stop nut 160 and stop washer 162 simultaneously compress the spring 164 until the stop washer 162 is seated upon the exposed periphery of the inner channel 120. Further rotational advancement of the bolt tip 156 into the receptacle bore 174 superposes and mechanically joins the active and passive coupling mechanisms 34 and 32, thereby closing any gap which may have existed between the interface surfaces 40 and 74. Rotational advancement of each of the bolts 134 of the active coupling mechanism 34 is performed according to a sequence or pattern known in the art so as to minimize any eccentric compression of the coupling mechanisms and to establish a proper unit compressive stress therebetween. Rotation of each bolt 134 can be performed manually or with the aid of a motorized, hand-held, tool (not shown). When the tightening sequence is complete, the active and passive coupling mechanisms 34 and 32 are considered to be hard docked, after which the tractor magnets 48 can be de-energized. The vestibule 128 can then be pressurized and the hatch covers 130, 132 can be removed to allow the passage of crew members and materials through the corresponding apertures 35 and 33. The coupling mechanisms 32 and 34 can be decoupled by reversing the above-described sequence.

Figure 5:
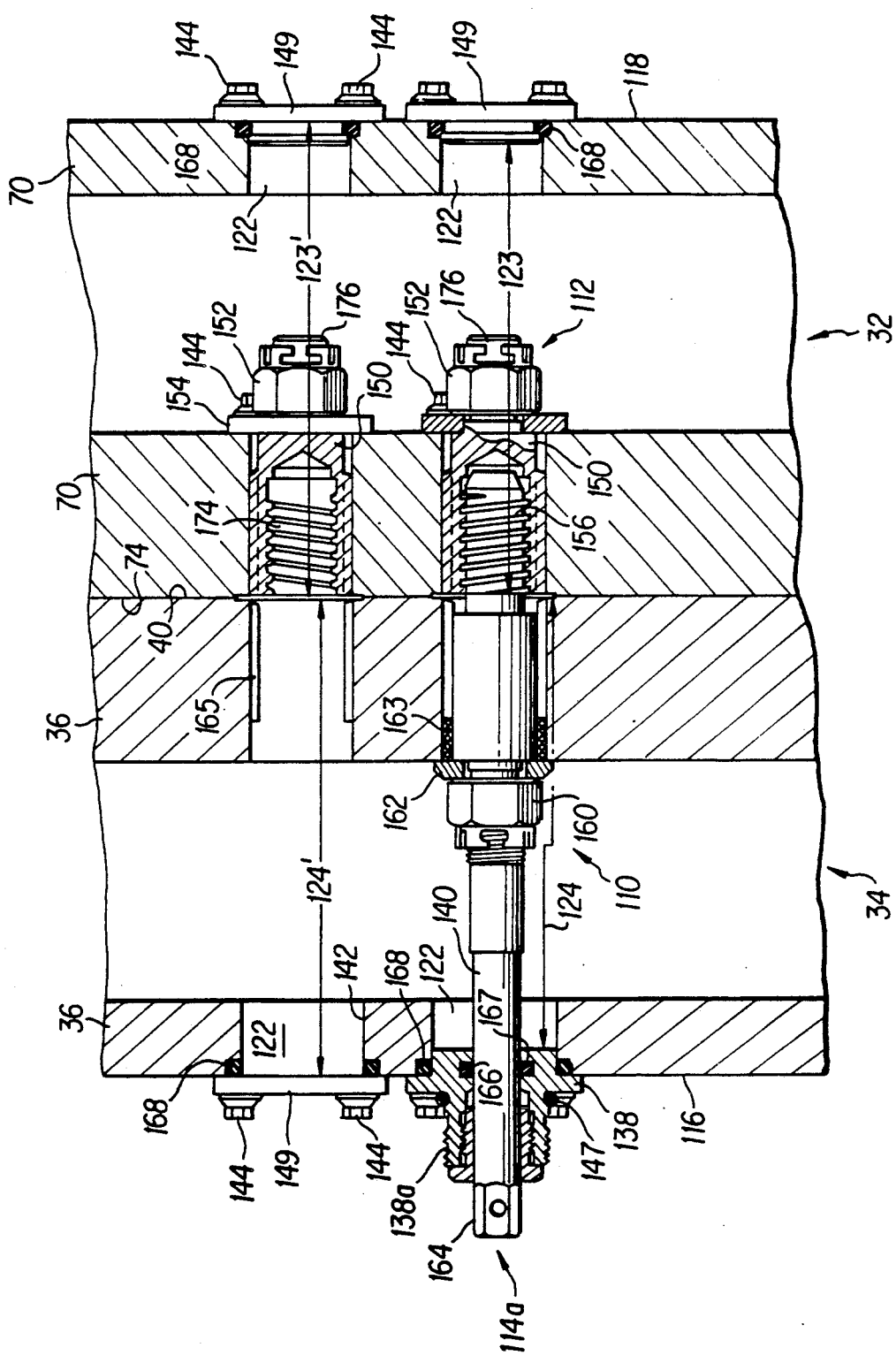
FIGS. 5-7 illustrate the steps of removal of an existing latch assembly and its replacement by another latch assembly in a neighboring channel of superposed coupling mechanisms.
Figure 6:
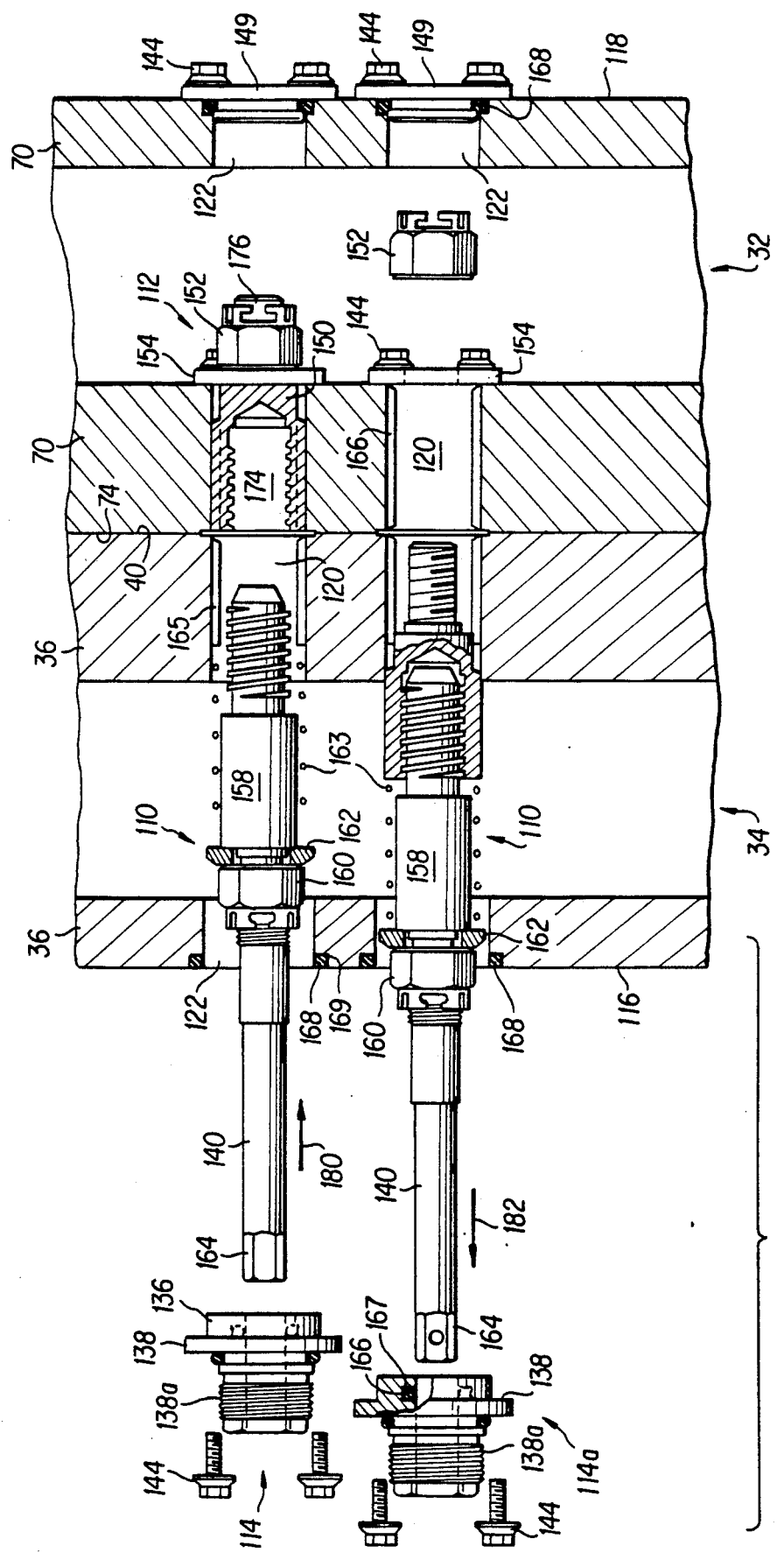
Figure 7:
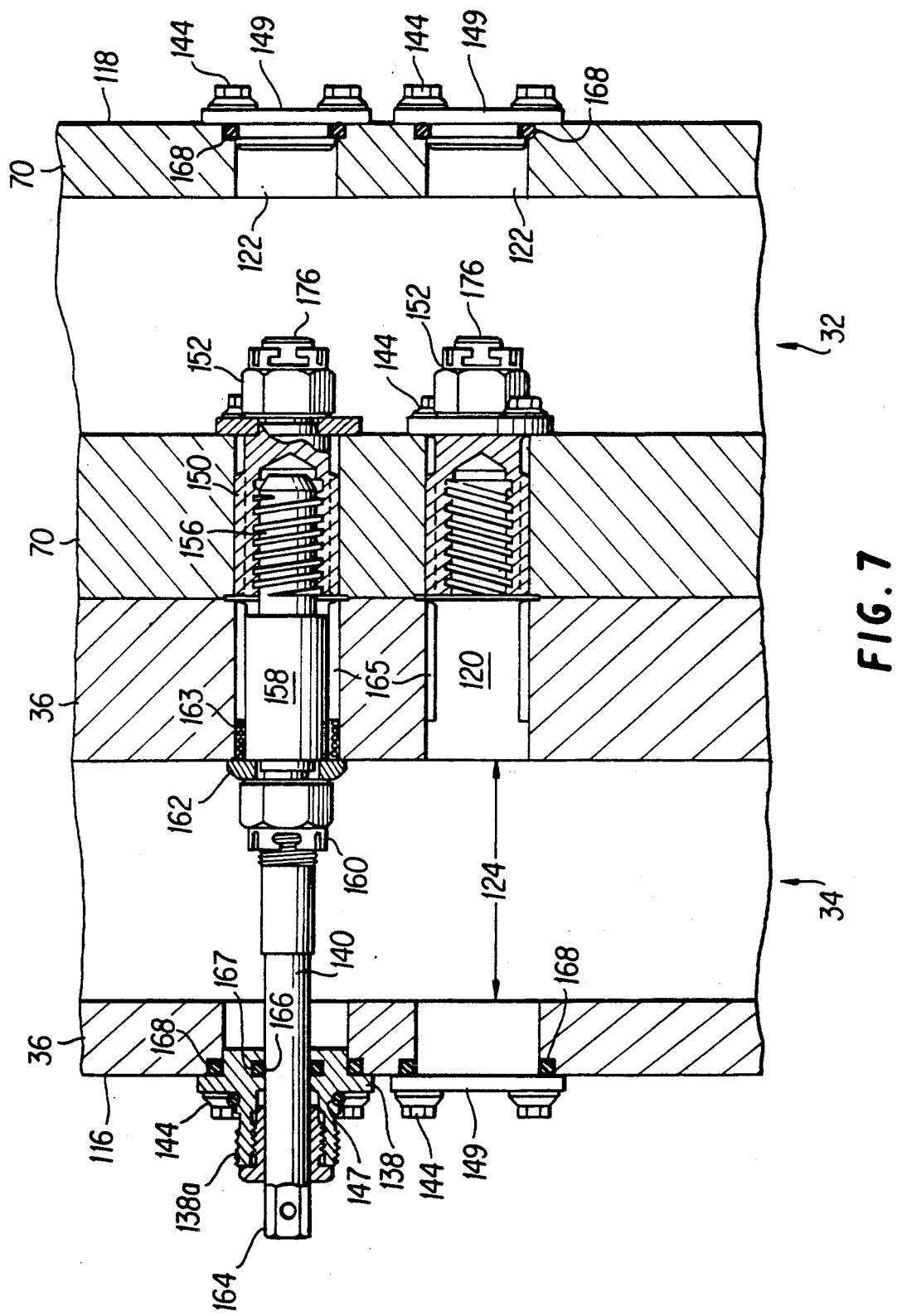

FIGS. 5-7 illustrate the sequence of steps for removal and/or replacement of a latch assembly from one coaxially-aligned pair of passageways 124 to another pair of passageways 124' while the active and passive mechanisms are hard docked and on-orbit. Such a transfer or changeover process may become necessary due to a failure of one of either the active or passive latch components 110, 112. Prior to effecting latch changeover, the vestibule 128 is pressurized, and the hatch covers 130, 132 are removed to permit vestibule access. An unoccupied bolt receptacle 150 is then mounted adjacent to the neighboring pair of aligned passageways 124'. Bolt receptacle mounting can be accomplished from an operator position within the vestibule 128. The cover 149 of the neighboring lower coupling mechanism outer channel 122 is removed, and a new compression seal 138 and bolt 134 having a stop nut 160, stop washer 162 and spring 164 preassembled thereon is inserted into the passageway 124' from the pressurizable side 116 in the direction of arrow 180 (FIG. 6). The new compression seal 138 is secured to the passageway outer channel 122 by fasteners 144, and the hexagonal head 165 of the new bolt is rotated to advance the threaded bolt tip 156 into the threaded bore of the unoccupied receptacle 150. After the new bolt is seated in the new bolt receptacle 150, the bolt 134 is further rotatably advanced and tightened to extinguish any gap between the interface surfaces 40, 74 which may have existed as a result, for example, of failure of an adjacent structural latch assembly. Thereafter, the pre-existing latch assembly, designated as 114a in the drawings, is disassembled by removing its passive and active components 112 and 110. The passive component 112 is disassembled by removing the bolt receptacle capture nut 152 from the inner channel 120 of the upper coupling mechanism 32. Thereafter, the active component 110 is removed from the coaxially-aligned lower coupling mechanism passageway 124 by removing the compression seal 138 and seal fasteners 144, and then withdrawing the bolt 134 and engaged bolt receptacle 150 in the direction of arrow 182 (FIG. 6). The removed bolt receptacle 150 can be replaced by a new receptacle and secured by a capture nut 152 to provide a new passive unit for subsequent use, and the coaxially-aligned outer channel 122 of the lower coupling mechanism 34 can be sealed by a cover 149. Any remaining failed latch assemblies can be removed and replaced in turn by the procedure described hereinabove. The joined coupling mechanisms 32, 34 can be uncoupled by reversing the hard dock procedure described with respect to FIGS. 3 and 4.

Although the present invention has been described with reference to a preferred embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A structural latch for detachably coupling first and second vehicle coupling mechanisms, each of the coupling mechanisms having a first pressurizable side, an interface surface formed along a second side, a flange extending between the pressurizable side and the interface surface so as to define a peripheral boundary of an interior cavity circumscribed by the flange, and a channel passageway extending between the interface surface and the pressurizable side, the channel passageways being coaxially alignable upon superposition of the coupling mechanisms, the structural latch comprising:

a bolt reciprocably extensible from the channel passageway of the first coupling mechanism to the channel passageway of the second coupling mechanism;

means for establishing a pressure-tight seal between the bolt and the pressurizable side of the first coupling mechanism;

a bolt receptacle mountable adjacent the passageway of the second coupling mechanism; and means detachably coupled to the bolt receptacle for retaining the bolt receptacle adjacent the channel passageway of the second coupling mechanism, whereby the bolt is reciprocably extensible through the coaxially-aligned channel passageways to engage the bolt receptacle and couple the first and second coupling mechanisms, the bolt receptacle retaining means being selectively removable from the bolt receptacle to permit selective retrieval of the bolt and engaged bolt receptacle through said coaxially-aligned channel passageways.

2. The structural latch as recited in claim 1, wherein said bolt comprises a threaded tip portion, and said bolt receptacle comprises an interior surface correspondingly-threaded to receive the threaded bolt tip upon rotational advancement of the bolt tip into the bolt receptacle.

3. The structural latch as recited in claim 1, wherein said means for establishing a pressure-tight seal comprises a compression seal.

4. The structural latch as recited in claim 3, wherein said compression seal is detachably mounted adjacent to said channel passageway of the first coupling mechanism.

5. The structural latch as recited in claim 3, further comprising a removable cover for covering at least a portion of said compression seal.

6. The structural latch as recited in claim 1, further comprising means for facilitating retraction of said bolt from said bolt receptacle.

7. The structural latch as recited in claim 6, wherein said means for facilitating retraction of said bolt comprises a resilient member carried by said bolt.

8. The structural latch as recited in claim 7, wherein said resilient member urges said bolt away from said channel passageway of the second coupling mechanism upon withdrawal of said bolt from said bolt receptacle.

9. The structural latch as recited in claim 8, wherein said resilient member is adjustably mounted to said bolt.

10. The structural latch as recited in claim 1, wherein said bolt receptacle comprises mounting means for non-rotatably mounting the bolt receptacle within said channel passageway of the second coupling mechanism.

11. The structural latch as recited in claim 10, wherein said mounting means comprises a spline formed along an exterior surface of the bolt receptacle, said receptacle spline being engageable with a corresponding spline formed along a surface of said channel passageway of the second coupling mechanism.

12. The structural latch of claim 1, wherein said bolt receptacle retaining means comprises:

a capture nut adapted for engaging said bolt receptacle;

a shoulder washer positionable on said receptacle between said capture nut and the second coupling mechanism adjacent said second coupling mechanism channel passageway; and a fastener for attaching said shoulder washer to the second coupling mechanism.

13. A method for replacing an interconnected first bolt and first bolt receptacle of a structural latch positioned in first and second joined coupling mechanisms, the first and second coupling mechanisms each having a flange provided with a first edge and an interface surface formed along a second edge, an interior cavity bounded by the flange and extending between the first and second flange edges, and first and second parallel channel passageways extending between the first and second flange edges, corresponding first and second channel passageways of the coupling mechanisms being coaxially alignable upon superposition of the coupling mechanisms, the first bolt receptacle being retained in position by receptacle retaining means adjacent the first channel passageway of the second coupling mechanism to receive the first bolt extending through the first channel passageway of the first and second coupling mechanisms, the method comprising the steps of:

mounting a second bolt receptacle adjacent the second channel passageway of the second coupling mechanism;

inserting a second bolt through the second channel passageway of the first coupling mechanism;

advancing the second bolt to engage the second bolt receptacle;

securing together the second bolt and second bolt receptacle;

removing the receptacle retaining means from the first receptacle; and retrieving the first bolt and engaged first bolt receptacle through said coaxially-aligned first channel passageways.

14. A method according to claim 13, wherein the second bolt receptacle is mounted adjacent the second channel passageway from a position in the interior cavity of the second coupling mechanism.

15. A method according to claim 13, wherein the receptacle retaining means of the first bolt receptacle is removed from a position within the interior cavity of the second coupling mechanism.

* * * * *